US007969592B2

(12) United States Patent
Bonikowski et al.

(10) Patent No.: US 7,969,592 B2
(45) Date of Patent: Jun. 28, 2011

(54) PRINTING AND COPYING FAULT MONITORING USING COVER SHEETS

(75) Inventors: Gregg A. Bonikowski, Rochester, NY (US); Robert VanEe, Sodus Point, NY (US)

(73) Assignee: Xerox Corporation, Norwalk, CT (US)

( * ) Notice: Subject to any disclaimer, the term of this patent is extended or adjusted under 35 U.S.C. 154(b) by 1104 days.

(21) Appl. No.: 11/381,369

(22) Filed: May 3, 2006

(65) Prior Publication Data

US 2007/0256586 A1 Nov. 8, 2007

(51) Int. Cl.
*G06K 15/00* (2006.01)

(52) U.S. Cl. ..................... 358/1.14; 358/1.13; 358/1.15; 399/382; 270/52.01; 270/52.03; 270/52.04; 270/58.31

(58) Field of Classification Search ................. 358/1.13, 358/1.14, 1.15; 270/52.01, 52.03, 52.04, 270/52.06, 58.31; 399/382
See application file for complete search history.

(56) References Cited

U.S. PATENT DOCUMENTS 4,211,483 A 7/1980 Hannigan et al.
5,316,279 A 5/1994 Corona et al.
5,547,178 A * 8/1996 Costello ..................... 270/52.02
5,709,374 A * 1/1998 Taylor et al. ................. 270/1.02
5,845,057 A * 12/1998 Takeda et al. ................ 358/1.15
6,032,004 A 2/2000 Mirabella, Jr. et al.
6,688,785 B2 * 2/2004 Tjan ................................ 400/76
7,061,635 B1 * 6/2006 Wanda et al. ................ 358/1.15
7,274,473 B2 * 9/2007 Parry ........................... 358/1.14
2002/0167554 A1 * 11/2002 Parry ................................ 347/5
2005/0024398 A1 * 2/2005 Kanamaru ........................ 347/7
2005/0185222 A1 8/2005 Sammis et al.

* cited by examiner

*Primary Examiner* — Chan S Park
*Assistant Examiner* — Jacky X Zheng
(74) *Attorney, Agent, or Firm* — Gibb I.P. Law Firm, LLC

(57) ABSTRACT

The disclosed method identifies potentially faulty sheets that were printed when the parameters were outside the predetermined normal parameter range and maintains one or more locations of the potentially faulty sheets within the stacks of sheets. If one or more of the stacks of sheets contain one or more of the potentially faulty sheets, the method prints one or more printing fault cover sheets and outputs the printing fault cover sheets to the stacks of sheets that contain the potentially faulty sheets. The printing fault cover sheets identify the locations of the potentially faulty sheets within the stacks of sheets. By providing the printing fault cover sheets and continuing the printing operation, the method can be set to stop the printing only for printing parameters that physically prevent printing, and not for printing parameters that only affect printing quality, thereby maintaining high productivity while still allowing the user to easily locate sheets that potentially have printing faults.

17 Claims, 2 Drawing Sheets

PRINTING AND COPYING FAULT MONITORING USING COVER SHEETS

BACKGROUND

Embodiments herein generally relate to printing devices such as electrostatographic printers and copiers or reproduction machines, and more particularly, concerns a method of monitoring and reporting potentially faulty printed sheets.

In printing and copying systems, there is a system tradeoff between productivity and ensured image quality. Production systems may maximize image quality (at the cost of productivity) by shutting down the printing system when a potential problem has been identified, and requiring appropriate operator intervention at that point to resolve the condition. In this case, any potentially defective sheets are not delivered to the output stack, or are the most recently delivered sheets, making it easy for the operator to identify which sheets to inspect for potential defects. For example, see U.S. Patent Publication 2005/0185222 (incorporated fully herein by reference) which describes that if the integrity system finds that the sheets are out of order or missing, it stops the printer and a warning message on the integrity controller advises the operator of an integrity fault.

Production systems can also maximize productivity (at the potential cost of image quality) by only shutting down for physical component failures (jams, etc.), and automatically recovering from any other failures relating only to printing quality. In this case, it is possible that the system 'knows' that one or more delivered sheets may have some defects, but communicating the specific point in the output where the problem occurred is problematic. Current systems typically follow static rules to shut down if severe defects are detected. Some systems may post a message to the printer GUI indicating that print quality defects may have occurred (typically without indicating specific sheet(s) for these defects).

SUMMARY

Embodiments herein include a method of printing/copying. The method prints one or more media sheets using one or more printing devices and outputs the sheets from the printing devices to one or more output devices as stacks of sheets. The output devices can comprise stacking devices, sorting devices, finishing devices, etc. The method monitors printing parameters during the printing of the sheets. If the printing parameters move outside a predetermined normal parameter range during the printing, the method determines whether the printing devices can continue the printing based on how far the parameters are outside the predetermined normal parameter range and/or based on user input.

The method identifies potentially faulty sheets that were printed when the parameters were outside the predetermined normal parameter range and maintains one or more locations of the potentially faulty sheets within the stacks of sheets. If printing is continued, the method continually adjusts the parameters during the printing to return the parameters to within the predetermined normal parameter range, if and when the parameters move outside the predetermined range. If one or more of the stacks of sheets contain one or more of the potentially faulty sheets, the method prints one or more printing fault cover sheets and outputs the printing fault cover sheets to the stacks of sheets that contain the potentially faulty sheets. The printing fault cover sheets identify the locations of the potentially faulty sheets within the stacks of sheets. By providing the printing fault cover sheets and continuing the printing operation, the method can be set to stop the printing only for printing parameters that physically prevent printing, and not for printing parameters that only affect printing quality, thereby maintaining high productivity while still allowing the user to easily locate sheets that potentially have printing faults.

The printing fault cover sheets can be output to tops of the stacks of sheets to easily allow the user to locate the potentially faulty printed sheets. In addition, the printing fault cover sheets can be offset from the stacks of sheets or a different sized paper can be used to print the printing fault cover sheets, such that the printing fault cover sheets extend a unique distance from the stacks of sheets when compared to other sheets within the stacks of sheets.

Thus, the methodology disclosed herein provides printing/copying production systems with options for making productivity versus image quality decisions and produces printing fault cover sheets describing characteristics of the output stacks to help the user to recover from sub-standard output. With this methodology, the user is able to control whether the printing/copying system will be shut down when a sensor detects a possible quality problem (wherein the printing/copying system waits for the user to determine whether corrective actions need to be taken before the printing job continues) or whether the system will continue printing, but will print a printing fault cover sheet indicating the location of a potentially faulty printed sheet(s) to allow the user to evaluate the quality of the potentially faulty printed sheet(s) at a later time. That is, the method disclosed herein offers the user extra options for quality control without sacrificing productivity.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, in printing and copying systems, there is a system tradeoff between productivity and ensured image quality. To provide the user with the most flexibility in balancing this tradeoff, the embodiments herein allow potentially defective printing to continue and identify potentially faulty sheets that were printed when the parameters were outside the predetermined normal parameter range. The methods herein maintain one or more locations of the potentially faulty sheets within the stacks of sheets. If one or more of the stacks of sheets contain one or more of the potentially faulty sheets, the method prints one or more printing fault cover sheets and outputs the printing fault cover sheets to the stacks of sheets that contain the potentially faulty sheets. The printing fault cover sheets identify the locations of the potentially faulty sheets within the stacks of sheets. By providing the printing fault cover sheets and continuing the printing operation, the method can be set to stop the printing only for printing parameters that physically prevent printing, and not for printing parameters that only affect printing quality, thereby maintaining high productivity while still allowing the user to easily locate sheets that potentially have printing faults.

Figure 2:
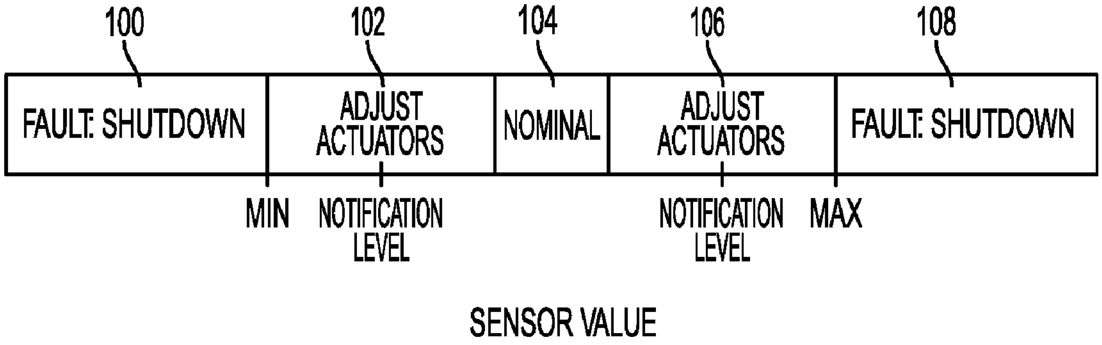
FIG. 2 is a schematic diagram illustrating fault thresholds.
Figure 3:
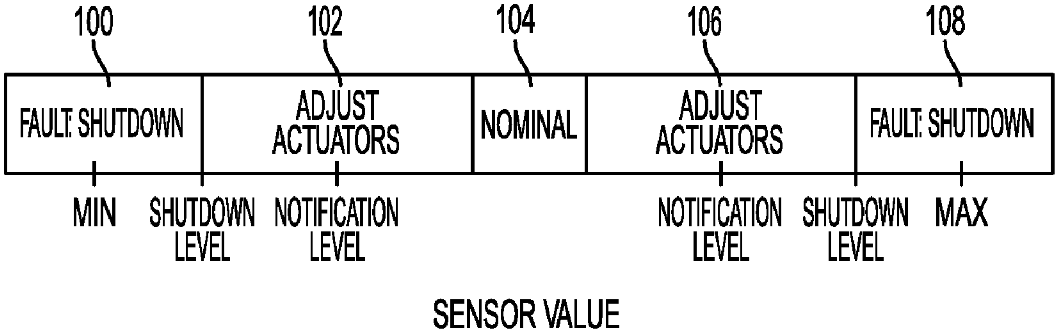
FIG. 3 is a schematic diagram illustrating fault thresholds.
Figure 4:
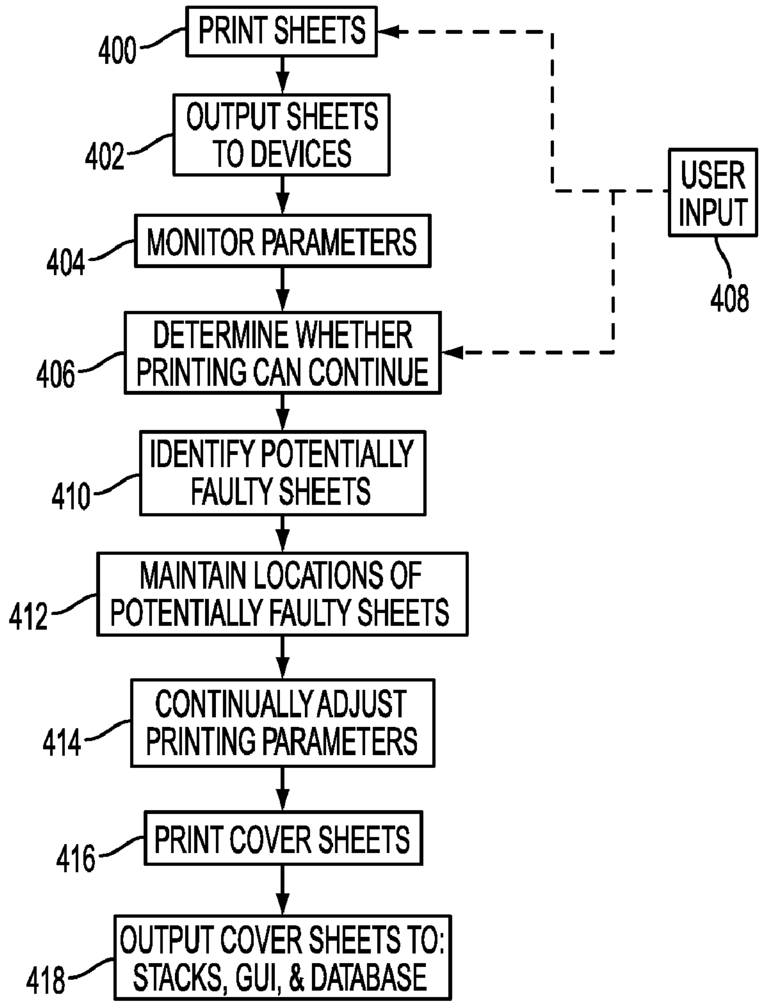
FIG. 4 is a flow diagram illustrating aspects of embodiments herein.

More specifically, as shown in the flowchart of FIG. 4, and as illustrated in FIG. 1-3 and 5, in item 400, the method prints one or more media sheets using one or more printing devices and, in item 402, outputs the sheets from the printing devices to one or more output devices as stacks of sheets.

Figure 5:
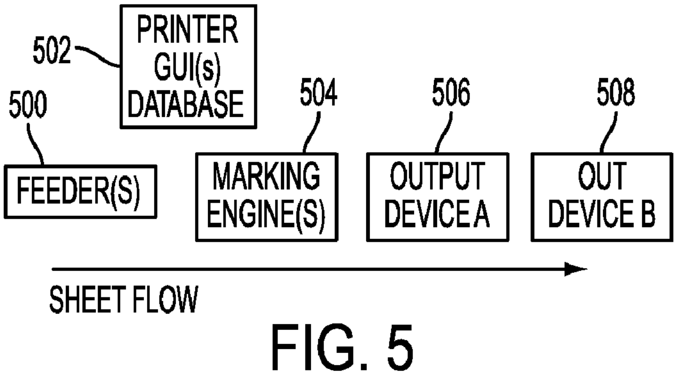
FIG. 5 is a schematic diagram of a printing system.

One example of a system to accomplish the printing and stacking is shown in FIG. 5 and includes one or more media sheet feeders 500, one or more graphic user interfaces (GUI's) 502, one or more marking engines 504, and one or more output devices 506, 508 (all of which are interconnected). The output devices 506 can comprise any type of output device including, but not limited to, stacking devices, sorting devices, finishing devices, etc. As sheets are printed, they are delivered to one of the available stacker destinations. When a stacker becomes full, the system automatically continues production to another available (typically empty) stacker. With the methodology set forth herein, the system ensures there is room for one additional sheet in the stacker when switching to another stacker. Once production to a given stacker is complete, the system determines whether any of the sheets in that stacker have potential image quality defects, and if they do, causes a ‘stacker cover page’ to be generated with detailed information on which portions of the stack may have such defects. This ‘stacker cover page’ is printed by the system, and, in some embodiments, is placed as the top sheet in the appropriate stacker prior to the customer being told to unload the stacker. The customer uses the information printed on this sheet to facilitate inspection of the output.

The method continuously monitors printing parameters during the printing of the sheets in item 404. If the printing parameters move outside a predetermined normal parameter range during the printing, the method determines whether the printing devices can continue (item 406) the printing based on how far the parameters are outside the predetermined normal parameter range and/or based on user input 408.

More specifically, as the system is printing, it continuously monitors a series of sensors and adjusts a series of actuators to maintain quality within expected boundaries. These sensor readings may be related to a specific print, or may be general physical conditions within the printing system or its surrounding environment. At any point in time, each sensor typically has a nominal range in which its readings are expected to lie; if the sensor reading is outside this range, the system may take one of several actions including but not limited to:

1. Adjusting actuators while printing in an attempt to bring the sensor readings back into a nominal range;
2. Pausing production but remaining cycled up (i.e., insert skipped dummy sheets) in an attempt to bring the sensor readings back into a nominal range; and
3. Shutting down the system to avoid delivering ‘bad’ prints.

In cases 1 and 2, there may be data and events logged by the system to record the potential problem for later diagnosis. In case 3, a fault code is typically logged identifying the specific cause of the shutdown. The decision on which action to take is can be hard coded into the control system algorithms for the printer, or can be adjusted by providing the user input 408 to item 400 before printing begins.

Figure 1:
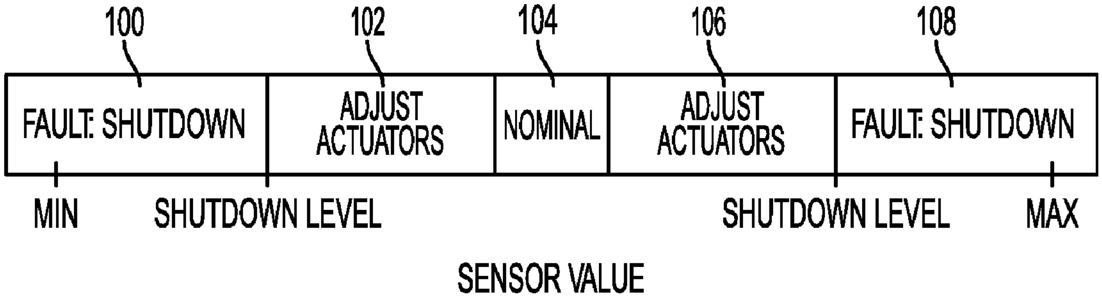
FIG. 1 is a schematic diagram illustrating fault thresholds.

The decision of whether to shut down or continue printing can be determined by various threshold levels, such as those depicted in FIGS. 1 and 2. More specifically, FIG. 1 illustrates a various range of conditions that could be detected by a given sensor. Item 104 represents normal operating conditions which indicate that operations are proceeding in a manner that will produce a non-faulty output. The minimum and maximum shown in FIG. 1 indicates the minimum and maximum operating conditions that can exist before the printer is no longer physically able to produce sheets. Therefore, beyond the minimum and maximum physical printing capabilities of the printing device, various items such as jams, broken parts, stuck devices, etc. occur which prevent movement of the media through the printing device. Within the minimum and maximum physical printing capabilities of the printing device, media sheets can move through the printing device; however, the printing quality may not be acceptable, especially if the conditions are outside the normal range 104.

In regions 102 and 106, the operating conditions sensed by the sensor indicate that adjustments are required to the operating conditions and/or actuators. While the operating conditions detected by the sensor indicate that operating parameters are outside the normal range 104, the likelihood of producing a faulty print is very low within regions 102 and 106, and therefore printing continues while adjustments are made to the operating-system parameters and actuators to return operating parameters to the normal range 104. However, if the operating conditions detected by the sensor indicate that the operating parameters are sufficiently outside the normal operating range 104 and have moved into ranges 100 and 108 (beyond the shutdown level), this indicates that printing quality will most likely be affected, and therefore the printing process will be stopped until the defect causing the error is corrected.

With the embodiments described herein, the user is provided the ability to expand regions 102 and 106 to the minimum and maximum printing capabilities of the printing device, as shown in FIG. 2. More specifically, FIG. 2 illustrates a situation where the user has elected to expand regions 102 and 106 to the minimum and maximum physical printing capabilities, which indicates that if the printer is physically capable of printing, the sheets will be printed, irrespective of image quality.

One difference between the users setting shown in FIGS. 1 and 2 is that, with the user settings shown in FIG. 2, when the sensor detects conditions which previously would have resulted in a shutdown (conditions outside the previous shutdown levels) a notification is produced with the settings shown in FIG. 2 and printing continues (concurrently with automated adjustments being made that attempt to return operating conditions to the normal range 104). As described below, the notification can comprise a warning on the graphic user interface 502, combined with, or instead of a printing fault cover sheet being output to the stack containing the potential faulty sheet(s).

Thus, when a sensor value moves outside the notification level (which is also user adjustable), this excursion is tracked by the printing system, and all pages being printed that could be impacted by this excursion are tracked internally. When this occurs, the system may indicate on the GUI that image quality may be degraded, and give the operator the option to force a shutdown of the system.

While FIGS. 1 and 2 illustrates two possible user settings, one ordinarily skilled in the art would understand that the methodology herein provides the user with the opportunity to select any range of intermediate shutdown levels. For example, FIG. 3 illustrates an intermediate user setting whereby the user is willing to accept some printing defects, yet is not willing to accept extreme printing defects. Therefore, in the user settings shown in FIG. 3, the shutdown level is positioned between the notification levels, and the minimum and maximum physical printing capabilities of the printing device. In one example, the graphic user interface can receive the user's preferences using any convenience scale (high-medium-low scale, percentage scale, etc.).

Further, the user input can be provided before, or during the printing operation. That is, for example, user preferences can be initially set and all following printing jobs obey such preferences. Alternatively, upon the detection of conditions outside the normal operating range 104, the printing job can pause and the user can be provided an opportunity to make a decision regarding their preferences at that time. Further, one ordinarily skilled in the art would understand that there are many other opportunities to solicit and accept user input regarding their preferences and the embodiments herein are intended to encompass all such opportunities. For example, embodiments herein can set quality levels on individual jobs (rather than as a printer policy that affects all jobs), so that different jobs can be guaranteed to print at different required levels of capability. Thus, the embodiments herein allow the system to maintain full production in more cases, and provide the operator with sufficient information to enable them to determine when (if ever) to halt production.

In item 410, the method identifies potentially faulty sheets that were printed when the parameters were outside the predetermined normal parameter range (e.g., outside the notification level) and, in item 412, maintains one or more locations of the potentially faulty sheets within the stacks of sheets. If printing is continued, the method continually adjusts the parameters during the printing to return the parameters to within the predetermined normal parameter range, if and when the parameters move outside the predetermined range in item 414. If one or more of the stacks of sheets contain one or more of the potentially faulty sheets, the method prints one or more printing fault cover sheets in item 416 and outputs the printing fault cover sheets to the stacks of sheets that contain the potentially faulty sheets in item 418.

In addition, the cover sheets produced in item 418 can include information regarding the ultimate destination of the stack (e.g., which finishing machine should be utilized, which other stacks the items should be combined with, etc.) irrespective of whether the stack actually includes any potentially faulty sheets.

The printing fault cover sheets identify the locations of the potentially faulty sheets within the stacks of sheets. By providing the printing fault cover sheets and continuing the printing operation, the method can be set to stop the printing only for printing parameters that physically prevent printing, and not for printing parameters that only affect printing quality, thereby maintaining high productivity while still allowing the user to easily locate sheets that potentially have printing faults.

The printing fault cover sheets can be output to tops of the stacks of sheets to easily allow the user to locate the potentially faulty printed sheets. In addition, the printing fault cover sheets can be offset from the stacks of sheets or a different sized paper can be used to print the printing fault cover sheets, such that the printing fault cover sheets extend a unique distance from the stacks of sheets when compared to other sheets within the stacks of sheets. Further, in addition to, or as an alternative to using printing fault cover sheets, the same information can be supplied to the user GUI or to a database accessible by the user. Thus, the user can receive the information regarding the status of the stacks through a number of resources (printing fault cover sheets, GUI, database, etc.).

The printer shown in FIG. 5 can also be designed to automatically produce a standard reporting cover sheet for each physical stack output by the machine, irrespective of whether each stack contains a potentially faulty printed sheet. Often a banner or header page is inserted as a separator sheet between the print jobs. Examples of this are found in U.S. Pat. No. 4,211,483 to Hannigan et al., U.S. Pat. No. 5,316,279 to Corona et al., U.S. Pat. No. 5,547,178 to Costello, and U.S. Pat. No. 5,709,374 to Taylor et al., which are herein incorporated by reference in their entirety for their teaching. Such a standard reporting cover sheet contains system-generated information about the stack contents, such as: the complete job(s) contained in the stack, which partial portion(s) of the job are contained within the stack (where jobs have been split across multiple stackers), any system-detected potential integrity/quality problems within that stack, etc. The methodology herein adds an identifier to such standard reporting cover sheets which specifies the location(s) of potentially faulty printed sheets within the stack.

There are a number of functional and operability features that can be implemented along with this behavior. For example, one embodiment herein provides the user the option to either always generate stacker printing fault cover sheets, or only generate them when potential defects in that stack have been detected by the system. Similarly, when an operator requests a manual shutdown (i.e., stops the printer), the embodiments herein allow the user to specify whether a stacker cover page should be generated for any non-full stacks. Also, when an operator requests termination of a job, the methods herein allow the user to specify whether a stacker cover page should be generated for any non-full stacks. In addition to (or instead of) producing physical stacker cover pages, embodiments herein can make this information available for viewing at the GUI. Methods herein also allow a stacker cover page to be generated at job boundaries and at the location of the potential printing fault itself (potentially offset from the rest of the stack), with multiple jobs/stacker cover pages per physical stack.

The cover pages used herein can also include information that summarizes the total output in a stacker regardless of whether the stacker contains sheets with potential errors, including but not limited to:

a. List of jobs complete included in the stacker;

b. For transaction or variable data jobs, the starting and ending records contained within that stacker; and c. For partial jobs, the starting and ending sets/sheets within that stacker.

These features facilitate management of output within and across stackers.

Thus, the printing system maintains full productivity whenever it is physically able to do so, and communicates to the operator (through local or remote GUIs 502) when a potential problem may have occurred. The operator can elect to use this information to shut down the machine, or can allow production to continue and validate the output at a later time (both as shown by the user input 408 supplied to item 406). If the operator elects to continue printing despite the potential printing fault, the printing fault cover sheets are delivered to each stack direct the operator to specific points in the stack where potential problems exist, enabling the operator to quickly identify the suspect output and take any necessary recovery actions.

The word "printer" or "image output terminal" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

Thus, the methodology disclosed herein provides printing/copying production systems with options for making productivity versus image quality decisions and produces printing fault cover sheets describing characteristics of the output stacks to help the user to recover from sub-standard output. With this methodology, the user is able to control whether the printing/copying system will be shut down when a sensor detects a possible quality problem (wherein the printing/copying system waits for the user to determine whether corrective actions need to be taken before the printing job continues) or whether the system will continue printing, but will print a printing fault cover sheet indicating the location of a potentially faulty printed sheet(s) to allow the user to evaluate the quality of the potentially faulty printed sheet(s) at a later time. That is, the method disclosed herein offers the user extra options for quality control without sacrificing productivity.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A method comprising:

printing one or more media sheets using one or more printing devices; outputting said sheets from said printing devices to one or more output devices stacks of sheets;

monitoring printing image quality parameters comprising at least one faulty image output parameter during said printing of said sheets;

identifying potentially faulty sheets of said printed sheets that were printed when said image quality parameters were outside a predetermined normal image quality parameter range;

maintaining one or more locations of said potentially faulty sheets within said stacks of sheets; and if a stack of sheets of said stacks of sheets contain one or more of said potentially faulty sheets, printing a printing fault cover sheet and outputting said printing fault cover sheet to said stack of sheets that contains said potentially faulty sheets, wherein said printing fault cover sheet identifies said locations of said potentially faulty sheets within said stack of sheets, wherein said printing fault cover sheet further comprises:

a list of jobs complete included in the stacker;

for transaction or variable data jobs, the starting and ending records contained within that stacker; and for partial jobs, the starting and ending sets/sheets within that stacker.

2. The method according to claim 1, wherein said printing fault cover sheet is output to a top of said stack of sheets.

3. The method according to claim 1, wherein said printing fault cover sheet is offset from said stack of sheets.

4. The method according to claim 1, wherein said output devices comprise one of stacking devices, sorting devices, and finishing devices.

5. The method of claim 1, in which said printing one or more media sheets comprises printing outside of said normal image quality and within an printer image capability range based on user preferences selected using a scale.

6. The method of claim 5 in which the scale comprises one of: a textually descriptive scale and a numeric scale.

7. The method of claim 6, in which the textually descriptive scale comprises textually descriptive user interface elements comprising labels associated with at least one of: high-medium-low and high-low.

8. The method of claims 6, in which the numeric scale comprises a user interface element that indicates percentage.

9. A computer-readable non-transitory medium storing instructions that, when executed by a computer, cause the computer to perform a method comprising:

printing one or more media sheets using one or more printing devices;

outputting said sheets from said printing devices to one or more output devices as stacks of sheets;

monitoring image quality printing parameters comprising at least one faulty image output parameter during said printing of said sheets;

identifying potentially faulty sheets of said printed sheets that were printed when said image quality parameters were outside a predetermined normal image quality parameter range;

maintaining one or more locations of said potentially faulty sheets within said stacks of sheets; and if a stack of sheets of said stacks of sheets contain one or more of said potentially faulty sheets, printing a printing fault cover sheet and outputting said printing fault cover sheet to said stack of sheets that contains said potentially faulty sheets, wherein said printing fault cover sheet identifies said locations of said potentially faulty sheets within said stack of sheets, wherein said printing fault cover sheet further comprises:

a list of jobs complete included in the stacker;

for transaction or variable data jobs, the starting and ending records contained within that stacker: and for partial jobs, the starting and ending sets/sheets within that stacker.

10. A method comprising:

printing one or more media sheets using one or more printing devices;

outputting said sheets from said printing devices to one or more output devices as stacks of sheets;

monitoring printing image quality parameters comprising at least one faulty image output parameter during said printing of said sheets;

identifying potentially faulty sheets of said printed sheets that were printed when said image quality parameters are outside a dynamically determined normal image quality parameter range;

maintaining one or more locations of said potentially faulty sheets within said stacks of sheets; and if a stack of sheets of said stacks of sheets contain one or more of said potentially faulty sheets, printing a printing fault cover sheet and outputting said printing fault cover sheet to said stack of sheets that contains said potentially faulty sheets, wherein said printing fault cover sheet identifies said locations of said potentially faulty sheets within said stack of sheets, wherein said printing fault cover sheet further comprises:

a list of jobs complete included in the stacker;

for transaction or variable data jobs, the starting and ending records contained within that stacker; and for partial jobs, the starting and ending sets/sheets within that stacker.

11. The method according to claim 10, wherein said printing fault cover sheet is output to a top of said stack of sheets.

12. The method according to claim 10, wherein said printing fault cover sheet is offset from said stack of sheets.

13. The method according to claim 10, wherein said output devices comprise one of stacking devices, sorting devices, and finishing devices.

14. The method of claim 10, in which said printing one or more media sheets comprises printing outside of said normal image quality and within a printer image capability range based on user preferences selected using a scale.

15. The method of claim 14 in which the scale comprises one of: a textually descriptive scale and a numeric scale.

16. The method of claim 15, in which the textually descriptive scale comprises textually descriptive user interface elements comprising labels associated with at least one of: high-medium-low and high-low.

17. The method of claims 15, in which the numeric scale comprises a user interface element that indicates percentage.

* * * * *